United States Patent
Smith-Rose et al.

(10) Patent No.: US 12,341,793 B2
(45) Date of Patent: Jun. 24, 2025

(54) COMPUTER BASED SYSTEMS CONFIGURED TO ADJUST FREQUENCY SCANNING OF THE DARK WEB IN SEARCH OF INFORMATION AND METHOD OF USE THEREOF

(71) Applicant: Capital One Services, LLC, McLean, VA (US)

(72) Inventors: Asher Smith-Rose, Midlothian, VA (US); Joshua Edwards, Philadelphia, PA (US); Lin Ni Lisa Cheng, Great Neck, NY (US); Shabnam Kousha, Washington, DC (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 373 days.

(21) Appl. No.: 17/954,807

(22) Filed: Sep. 28, 2022

(65) Prior Publication Data
US 2024/0106843 A1 Mar. 28, 2024

(51) Int. Cl.
*H04L 9/40* (2022.01)
*G06N 3/08* (2023.01)

(52) U.S. Cl.
CPC .......... *H04L 63/1425* (2013.01); *G06N 3/08* (2013.01); *H04L 63/102* (2013.01)

(58) Field of Classification Search
CPC ..... H04L 63/1425; H04L 63/102; G06N 3/08; G06N 7/01; G06N 20/00; G06N 20/20
USPC .......................................................... 726/4
See application file for complete search history.

(56) References Cited

U.S. PATENT DOCUMENTS

| | | | |
|---|---|---|---|
| 7,293,063 B1 * | 11/2007 | Sobel | G06Q 10/107 709/206 |
| 7,441,429 B1 | 10/2008 | Nucci et al. | |
| 7,970,934 B1 * | 6/2011 | Patel | H04L 41/147 709/244 |
| 9,014,359 B1 | 4/2015 | Pfeffer et al. | |
| 10,291,774 B2 | 5/2019 | Qin et al. | |
| 10,496,994 B2 | 12/2019 | Hopper | |
| 2007/0121596 A1 * | 5/2007 | Kurapati | H04M 3/436 370/356 |
| 2008/0281794 A1 | 11/2008 | Mathur | |

(Continued)

*Primary Examiner* — Kambiz Zand
*Assistant Examiner* — Aubrey H Wyszynski
(74) *Attorney, Agent, or Firm* — Greenberg Traurig, LLP

(57) ABSTRACT

In some embodiments, the present disclosure provides an exemplary method that may include steps of obtaining a trained spam upsurge detection machine learning model that determines when a current frequency associated with spam communications received by a current user exceeds a baseline frequency associated with the current user; receiving a permission indicator identifying a permission by the user to detect communications being received by the computing device; receiving an indication of at least one communication being received; determining the at least one communication as a particular spam communication; updating a frequency at which spam communications have been received by the user based at least in part on the particular spam communication; utilizing the trained spam upsurge detection machine learning model to determine that the frequency exceeds a baseline frequency associated with the user; and initiating a scan of one or more dark web resources.

20 Claims, 7 Drawing Sheets

(56) References Cited

U.S. PATENT DOCUMENTS

2010/0154057 A1     6/2010  Ko et al.
2012/0297477 A1*   11/2012  Raviv ................. H04L 63/1425
                                                              726/22
2015/0381533 A1*   12/2015  Klemm ................... H04L 51/02
                                                             709/206
2024/0020476 A1*    1/2024  Singh ...................... G06F 40/30

* cited by examiner

COMPUTER BASED SYSTEMS CONFIGURED TO ADJUST FREQUENCY SCANNING OF THE DARK WEB IN SEARCH OF INFORMATION AND METHOD OF USE THEREOF

FIELD OF TECHNOLOGY

The present disclosure generally relates to computer-based systems configured to adjust frequency scanning of the dark web in search of information and methods of use thereof.

BACKGROUND OF TECHNOLOGY

Typically, deep web is the part of the World Wide Web that is not indexed by traditional search engines such as Google™ and would be run by darknets which, typically, are overlay networks within the Internet that could only be accessed with specific software, configurations, or authorization, and may often use unique customized communication protocol(s). Typically, enterprise computing resources for dark web monitoring may include searching for, and tracking, an amount of information on the dark web. Typically, dark web monitoring tools may be similar to a search engine, but specifically engineered for the dark web. Generally, dark web tools find leaked or stolen information or sensitive data that is being shared and sold among malicious actors operating on the dark web. Typically, the dark web may provide anonymity to individuals who may be interested in obtaining stolen digital credentials, credit card numbers, and other sensitive information.

SUMMARY OF DESCRIBED SUBJECT MATTER

In some embodiments, the present disclosure provides an exemplary technically improved computer-based method that includes the following steps of obtaining, by one or more processors, a trained spam upsurge detection machine learning model that determines when a current frequency associated with spam communications received by a current user exceeds a baseline frequency associated with the current user; receiving, by the one or more processors, from a computing device of a user, a permission indicator identifying a permission by the user to detect communications being received by the computing device; receiving, by the one or more processors, from the computing device, an indication of at least one communication being received; determining, by the one or more processors, the at least one communication as a particular spam communication; updating, by the one or more processors, a frequency at which spam communications have been received by the user based at least in part on the particular spam communication; utilizing, by the one or more processors, the trained spam upsurge detection machine learning model to determine that the frequency exceeds a baseline frequency associated with the user; and initiating, by the one or more processors, and in response to the determination, a scan of one or more dark web resources.

In some embodiments, the present disclosure provides an exemplary technically improved computer-based system that includes at least the following components of at least one processor configured to execute software instructions that cause the at least one processor to perform steps to: obtain a trained spam upsurge detection machine learning model that determines when a current frequency associated with spam communications received by a current user exceeds a baseline frequency associated with the current user; receive from a computing device of a user, a permission indicator identifying a permission by the user to detect communications being received by the computing device; receive from the computing device, an indication of at least one communication being received; determine the at least one communication as a particular spam communication; update a frequency at which spam communications have been received by the user based at least in part on the particular spam communication; utilize the trained spam upsurge detection machine learning model to determine that the frequency exceeds a baseline frequency associated with the user; and initiate, in response to the determination, a scan of one or more dark web resources.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
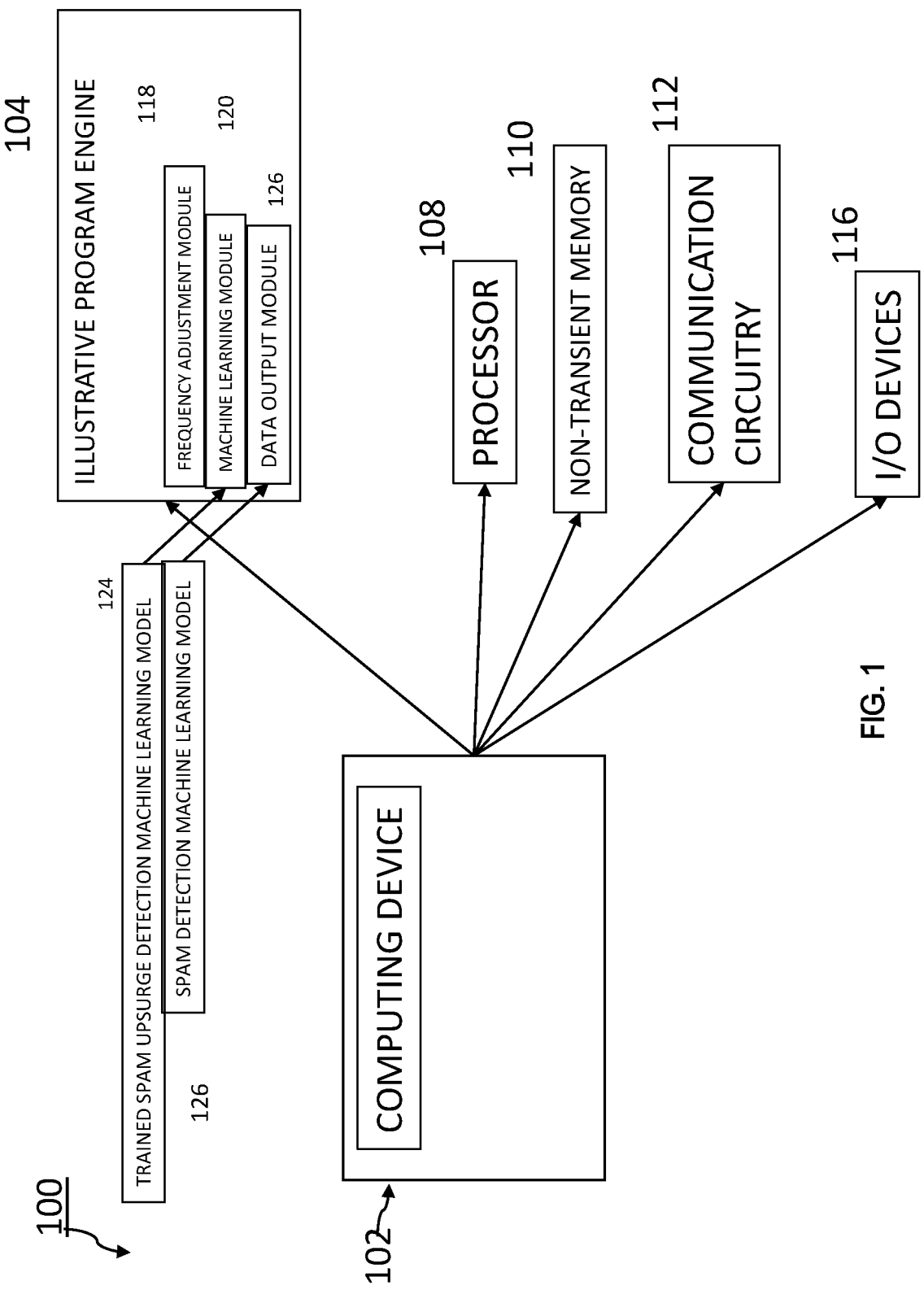
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

At least some embodiments of the present disclosure provide technological solution(s) to a technological computer-centered problem associated with a need to dedicate considerable computing processing resource to actively monitor the dark web for sensitive information associated with individual(s). The technological computer-centered problem associated with the active monitoring of the dark web for sensitive information may typically arise when there would be a surge in spam activity associated with at least one individual, which may increase the likelihood that the information associated with the at least one individual may be used, increases the amount of processing associated with computer resources to monitor the dark web, and decrease a level of security associated with a protection of the information associated with the same individual and/or other individuals that may be related by one or more similarity characteristics. As detailed herein, at least some embodiments of the present disclosure are directed to provide a technological computer-centered solution that would establish a baseline spam frequency associated with spam communications associated with the at least one individual and dynamically adjust the frequency of dark web scanning, in response to determining an elevated spam frequency above the established baseline spam frequency, in search of dark web for sensitive information associated with the at least one individual. In some embodiments, the present disclosure may utilize an frequency adjustment module to establish a baseline frequency associated with spam communications, monitor incoming communications to detect spam, update a current frequency, determine that the current frequency exceeds the established baseline frequency, and dynamically adjust the frequency in search of sensitive information associated with the at least one individual on the dark web.

FIG. 1 depicts a block diagram of an exemplary computer-based system and platform for dynamically adjusting a plurality of frequencies associated with a scan of the dark web in search for sensitive information associated with a plurality of individuals, in accordance with at least one embodiment.

In some embodiments, an illustrative computing system of the present disclosure 100 may include a computing device 102 associated with a user and an illustrative program engine 104. In some embodiments, the program 104 may be stored on the computing device 102. In some embodiments, the illustrative program engine 104 may reside on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example.

In some embodiments, the illustrative program engine 104 may be configured to instruct the processor 108 to execute one or more software modules such as, without limitations, a frequency adjustment module 118, a machine learning module 120, and/or a data output module 126.

In some embodiments, an exemplary frequency adjustment module 118, of the present disclosure, utilizes at least one machine learning technique and at least one natural language processing technique, or both, described herein, to determine when a current frequency associated with a spam communication received by a current user exceeds a baseline frequency associated with the current user; update the frequency at which spam communications have been received by the user based on a particular spam communication, and determine that a second frequency exceeds the baseline frequency to initiate a scan of one or more dark web resources. For example, the spam communication may refer to a fictitious interaction session, a fictitious electronic transmission, or a fictitious cellular transmission. In some embodiments, the exemplary frequency adjustment module 118 may receive a permission indication identifying a permission by the user to detect communications being received by the computing device 102. In some embodiments, the exemplary frequency adjustment module 118 may receive an indication of at least one communication being received. In some embodiments, the exemplary frequency adjustment module 118 may determine the at least one communication as a particular spam communication. In some embodiments, the exemplary frequency adjustment module 118 may update the frequency associated with received spam communications based at least in part on the particular spam communication. In some embodiments, the exemplary frequency adjustment module 118 may determine that the updated frequency exceeds the established baseline frequency associated with the user. Typically, the determination of the updated frequency exceeding the established baseline in response to the particular spam communication being received by the user may allow an external computing device to extract additional, sensitive information associated with the user without alerting the user of the extraction based on a failure of the existing technology to adjust the frequency associated with a scan of the plurality of dark web resources.

In some embodiments, the exemplary frequency adjustment module 118 may initiate a scan of a plurality of dark web resources. In some embodiments, the scan of the plurality of dark web resources may be based on at least one of, but not limited to, information associated with the user, information of the computing device 102 associated with the user, information associated with a communication account of the user, and information of an entity associated with the user. In some embodiments, the exemplary frequency adjustment module 118 may utilize a trained spam upsurge detection machine learning model 124. In some embodiments, the exemplary frequency adjustment module 118 may establish a baseline for the frequency by determining a first baseline frequency associated with the particular spam communication, a second baseline frequency associated the computing device 102 associated with the user, a third baseline frequency associated with a communication modality associated with the user, a fourth baseline frequency associated with a particular spam communication associated with a plurality of users, and a fifth baseline frequency associated with a spam communication associated with an entity affiliated with the user. In some embodiments, the exemplary frequency adjustment module 118 may determine the at least one communication as the spam communication by profiling the at least one communication based on a SIP certificate associated with the at least one communication. In some instances, the profiling of the at least one communication may refer to a plurality of categories or a plurality of types associated with the at least one communication. In some embodiments, the exemplary frequency adjustment module 118 may compute an adjusted frequency by aggregating and averaging the plurality of established baseline frequencies associated with the spam communication. In some embodiments, the exemplary frequency adjustment module 118 may instruct the computing device 102 to commence a plurality of security measures to address a risk associated with a result of the scan of the plurality of dark web resources. In some embodiments, the exemplary frequency adjustment module 118 may determine that the at least one communication is the spam communication by instructing the computing device 102 to execute a plurality of machine learning techniques, a plurality of natural language processing techniques, or both, to obtain context data, content data, or both, for the at least one communication; and determining that the at least one communication is the spam communication based on the obtained context data, content data, or both. In some embodiments, the exemplary frequency adjustment module 118 may automatically adjust the frequency associated with the scan of the plurality of dark web resources to prevent sensitive information associated with the user from being extracted via a fictitious interaction session with the user. In some embodiments, the exemplary frequency adjustment module 118 may instruct the computing device 102 to commence a plurality of security measures that address a plurality of risks associated with the result of the scan of the plurality of dark web resources.

In some embodiments, the exemplary frequency adjustment module 118 may utilize a trained spam upsurge detection machine learning model 124 to determine the at least one communication is a particular spam communication. In some instances, a plurality of types of communications, (e.g., incoming phone calls, text messages, emails, and/or video calls) may be ingested as training spam frequency data for the trained spam upsurge detection machine learning model 124. In some embodiments, the trained spam upsurge detection machine learning model 124 may be trained by ingesting spam frequency data associated with one or more users (e.g., training data associated with the same user, a mix of training data of a particular user and at least one other user, one or more other users, etc.) over a predetermined period of time; and establishing the baseline spam frequency associated with the spam frequency data over the predetermined period of time. In some instances, the ingestion of spam frequency data associated with one or more users may assign a plurality of values associated with each type of spam frequency data, dynamically aggregate the assigned values associated with the spam frequency data, and calculate an overall risk score associated with the spam frequency data based on the aggregated assigned values associated with each type of spam frequency data. In some embodiments, the exemplary frequency adjustment module 118 may utilize the trained spam upsurge detection machine learning model 124 to update the spam frequency associated with the spam communication(s) received by the one or more users based on, at least in part, the particular spam communication(s). In some embodiments, the exemplary frequency adjustment module 118 may utilize the trained spam upsurge detection machine learning model 124 to determine that the updated spam frequency exceeds the baseline spam frequency associated with the user. In some embodiments, the exemplary frequency adjustment module 118 may utilize the trained spam upsurge detection machine learning model 124 to initiate the scan of the plurality of dark web resources in response to the determination of the updated spam frequency associated with the spam communication received by the user exceeding the established baseline spam frequency.

In some embodiments, the present disclosure describes systems for utilizing the machine learning module 120 for determining the at least one communication as a particular spam communication. In some embodiments, the machine learning module 120 may update the spam frequency associated with the spam communication received by the one or more users. In some embodiments, the machine learning module 120 may update the spam frequency based at least in part on the particular spam communication. In some embodiments, the machine learning module 120 may determine that the updated frequency exceeds the baseline spam frequency associated with the user based on a comparison of the updated frequency and the baseline spam frequency. In some embodiments, the machine learning module 120 may initiate a scan of the plurality of dark web resources in response to the determination that the updated spam frequency exceeds the baseline spam frequency. In some embodiments, the machine learning module 120 may utilize the trained spam upsurge detection machine learning model 124 to determine the at least one communication is a particular spam communication. In some embodiments, the trained spam upsurge detection machine learning model 124 may update the spam frequency associated with the spam communication received by the one or more users based on, at least in part, the particular spam communication. In some embodiments, the trained spam upsurge detection machine learning model 124 may determine that the updated spam frequency exceeds the baseline spam frequency associated with the user. In some embodiments, the trained spam upsurge detection machine learning model 124 may initiate a scan of the plurality of dark web resources in response to the determination that the updated spam frequency exceeds the baseline spam frequency. In some embodiments, output of the machine learning module 120 may refer to the update to the spam frequency associated with the determination of a particular spam communication. In some embodiments, the output of the machine learning module 120 may refer to the determination that the updated spam frequency exceeds the baseline spam frequency associated with the spam communication received by the one or more users. In some embodiments, the output of the machine learning module 120 may refer to the initiation of the scan of the plurality of dark web resources. In some embodiments, the machine learning module 120 may instruct the computing device 102 to commence a plurality of security measures that address a plurality of risks associated with the result of the scan of the plurality of dark web resources.

In some embodiments, the data output module 122 may determine the at least one communication as a particular spam communication associated with the one or more users. In some embodiments, the data output module 122 may update the spam frequency associated with the spam communication received by the one or more users based on the at least one communication. In some embodiments, the data output module 122 may initiate a scan of a plurality of dark web resources in response to the determination that the at least one communication is a spam communication. In some embodiments, the data output module 122 may utilize a spam detection machine learning model 126 to determine the at least one communication is a particular spam communication. In some embodiments, the data output module 122 may display a result associated with the scan of the plurality of dark web resources. In some instances, the displayed results of the scan of the plurality of dark web resources may refer to information of the one or more users, information of the computing device 102 associated with the one or more users, information of a communication account associated with the one or more users, and/or information of an entity that is associated with the one or more users. In some embodiments, the data output module 122 may instruct the computing device 102 to commence a plurality of security measures that address a plurality of risks associated with the result of the scan of the plurality of dark web resources.

In some embodiments, the illustrative program engine 104 may obtain the train spam upsurge detection machine learning model 124 to determine when a current spam frequency associated with spam communications received by a current one or more users exceeds a baseline spam frequency associated with the current one or more users. In some embodiments, the illustrative program engine 104 may receive a permission indicator identifying a permission by the user to detect communications being received by the computing device 102 associated with the user. In some embodiments, the illustrative program engine 104 may receive an indication of at least one communication being received from the computing device 102. In some embodiments, the illustrative program engine 104 may determine the at least one communication as a particular spam communication. In some embodiments, the illustrative program engine 104 may update the spam frequency at which spam communications have been received by the one or more users based at least in part on the particular spam communication. In some embodiments, the illustrative program engine 104 may utilize the trained spam upsurge detection machine learning model 124 to determine that the updated spam frequency exceeds the baseline spam frequency associated with the one or more users. In some embodiments, the illustrative program engine 104 may initiate a scan of a plurality of dark web resources in response to the determination that the updated spam frequency exceeds the baseline spam frequency associated with the one or more users.

In some embodiments, the non-transient memory 110 may store the updated spam frequency associated with the spam communication associated with the one or more users. In some embodiments, the non-transient memory 110 may store the results of the initiated scans of the plurality of dark web resources associated with the one or more users. In some embodiments, the non-transient memory 110 may store the adjusted frequencies associated with the update and the results of the scans of the plurality of dark web resources associated with the one or more users in the server computing device 102.

Figure 2:
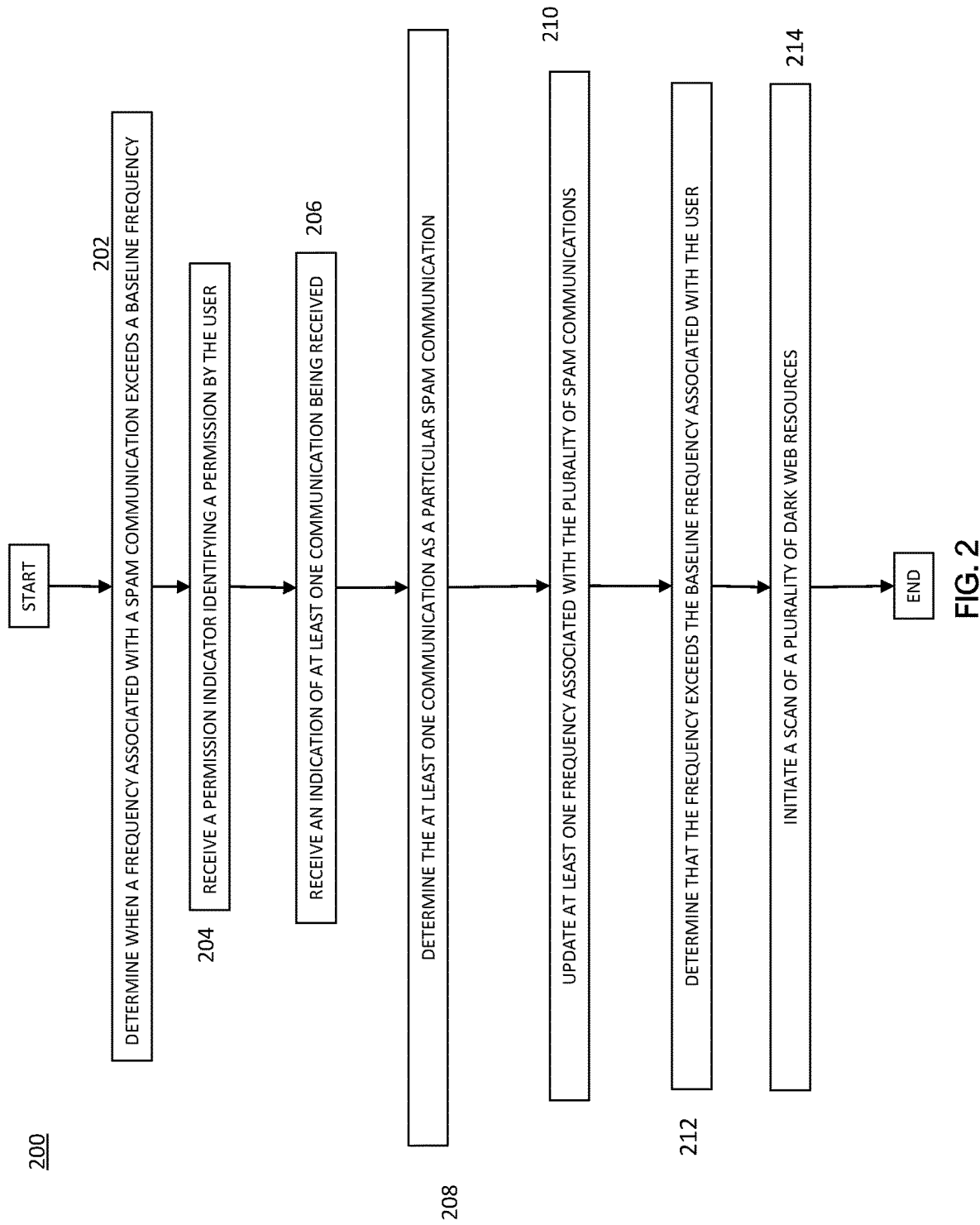
FIG. 2 is a flowchart illustrating operational steps for adjusting a frequency of scanning of the dark web in search for sensitive information associated with a user, in accordance with one or more embodiments of the present disclosure.

FIG. 2 is a flowchart 200 illustrating operational steps for adjusting a frequency of scanning of the dark web in search for sensitive information associated with one or more users, in accordance with one or more embodiments of the present disclosure.

In step 202, the illustrative program engine 104 within the computing device 102 may be programmed to determine when a spam frequency associated with a spam communication exceeds a baseline spam frequency. In some embodiments, the illustrative program engine 104 may obtain a trained spam upsurge detection machine learning model 124. In some embodiments, the illustrative program engine 104 may obtain the trained spam upsurge detection machine learning model 124 to determine when the current spam frequency associated with at least one spam communication exceeds the baseline spam frequency associated with the current one or more users. In some embodiments, the illustrative program engine 104 may determine when at least one current spam frequency associated with a plurality of spam communications exceeds the baseline spam frequency when received by the computing device 102 associated with the one or more users. In some embodiments, the exemplary frequency adjustment module 118 may determine when the current spam frequency associated with at least one spam communication exceeds the baseline spam frequency associated with the current one or more users. In some embodiments, the trained spam upsurge detection machine learning model 124 is trained to establish one of a first baseline spam frequency associated with the particular spam communication received by a particular user; a second baseline spam frequency associated with the particular spam communication received at a particular computing device of the particular user; a third baseline spam frequency associated with the particular spam communication received at a particular communication modality of the particular user; a fourth baseline spam frequency associated with the particular spam communication received by a group of users; and/or a fifth baseline spam frequency associated with the particular spam communication received by an entity that is affiliated with the particular user.

In step 204, the illustrative program engine 104 may receive a permission indicator identifying a permission by the one or more users. In some embodiments, the illustrative program engine 104 may receive the permission indicator identifying the permission by the one or more users to detect communication being received by the computing device 102. In some embodiments, the exemplary frequency adjustment module 118 may receive the permission indicator identifying the permission by the one or more users to detect communication being received by the computing device 102.

In step 206, the illustrative program engine 104 may receive an indication of at least one communication being received. In some embodiments, the illustrative program engine 104 may receive the indication of the at least one communication being received from the computing device 102 associated with the one or more users. In some embodiments, the illustrative program engine 104 may receive the indication of the at least one communication being received by the server computing device 106 (not shown) in communication with the computing device 102 associated with the one or more users. In some embodiments, the exemplary frequency adjustment module 118 may receive the indication of the at least one communication being received from the computing device 102 associated with the one or more users.

In step 208, the illustrative program engine 104 may determine the at least one communication as a particular spam communication. In some embodiments, the illustrative program engine 104 may determine the at least one communication as a plurality of particular spam communications associated with the one or more users. In some embodiments, the illustrative program engine 104 may determine the at least one communication as a plurality of particular spam communications associated with the one or more users by profiling the at least one communication based on session interaction protocol certificate (SIP) of the at least one communication. In some embodiments, the illustrative program engine 104 may determine the at least one communication as a plurality of particular spam communications associated with the one or more users by utilizing a spam detection machine learning model 126 to determine that the at least one communication as the particular spam communication. In some embodiments, the illustrative program engine 104 may determine the at least one communication as a plurality of particular spam communications associated with the one or more users by instructing the computing device 102 to execute at least one machine learning technique, at least one natural language processing technique, and/or both, to obtain content data, context data, and/or both, for the at least one communication. In some embodiments, the illustrative program engine 104 may determine the at least one communication as a plurality of particular spam communications associated with the one or more users by receiving the context data, the content data, and/or both, for the at least one communication from the computing device 102 and determining when the at least one communication is the particular spam communication based on the context data, content data, and/or both, for the at least one communication. In some embodiments, the exemplary frequency adjustment module 118 may determine the at least one communication as a plurality of particular spam communications associated with the one or more users.

In step 210, the illustrative program engine 104 may update at least one spam frequency associated with the plurality of spam communications have been received by the one or more users. In some embodiments, the illustrative program engine 104 may update the at least one spam frequency associated with the plurality of spam communications have been received by the one or more users based at least in part on the particular spam communication. In some embodiments, the illustrative program engine 104 may dynamically update a plurality of spam frequencies associated with the plurality of spam communications that have been received by the one or more users based at least in part on the plurality of particular spam communications. In some embodiments, the exemplary frequency adjustment module 118 may update the at least one spam frequency associated with the plurality of spam communications have been received by the one or more users based at least in part on the particular spam communication.

In step 212, the illustrative program engine 104 may determine that the spam frequency exceeds the baseline spam frequency associated with the one or more users. In some embodiments, the illustrative program engine 104 may utilize the trained spam upsurge detection machine learning model 124 to determine that the updated spam frequency exceeds the baseline spam frequency associated with the one or more users. In some embodiments, the exemplary frequency adjustment module 118 may utilize the trained spam upsurge detection machine learning model 124 to dynamically determine that the updated frequency exceeds the established baseline frequency associated with the plurality of spam communications received by the user. In some embodiments, the updated frequency is computed based on communications received at a plurality of communication modalities. In some embodiments, the updated frequency is computed based on communication received at one communication modality.

Figure 3:
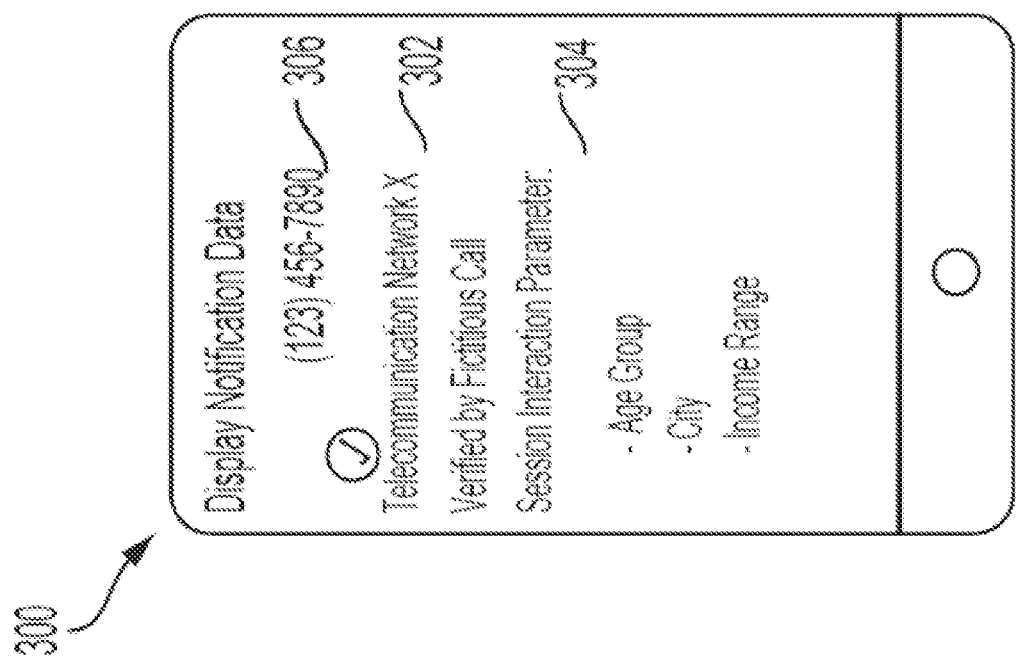
FIG. 3 is a diagram illustrating an adjusted frequency scan of at least one dark web resource, in accordance with one or more embodiments of the present disclosure.

In step 214, the illustrative program engine 104 may initiate a scan of a plurality of dark web resources. In some embodiments, the illustrative program engine 104 may automatically initiate the san of the plurality of dark web resources in response to the determination that the updated frequency exceeds the established baseline frequency associated with the plurality of spam communications received by the user. In some embodiments, a plurality of results associated with the initiated scan of the plurality of dark web resources include information of the user, information of the computing device 102 associated with the user, information of a communication account of the user, and/or information of an entity that is associated with the user. In some embodiments, the illustrative program engine 104 may instruct the computing device 102 to commence a plurality of security measures that address a plurality of risks associated with the result of the scan of the plurality of dark web resources. In some embodiments, the exemplary frequency adjustment module 118 may automatically initiate the san of the plurality of dark web resources in response to the determination that the updated frequency exceeds the established baseline frequency associated with the plurality of spam communications received by the user FIG. 3 depicts an exemplary diagram 300 of an exemplary computer-based system and platform for automatically adjusting a frequency associated with an initiated scan of a plurality of dark web resources, in accordance with at least one embodiment of the present disclosure.

In some embodiments, the exemplary frequency adjustment module 118 may automatically adjust the updated frequency 306 associated with the plurality of spam communications received by the computing device 102 associated with the user. In some embodiments, the exemplary frequency adjustment module 118 may initiate a scan of a plurality of dark web resources 302 when the adjusted, updated frequency 306 exceeds the established baseline frequency associated with the user. In some embodiments, the exemplary frequency adjustment module 118 may determine a result of the initiated scan of the plurality of dark web resources 302 to display a plurality of sensitive information 304 associated with the user that may be displayed via at least one GUI programmable element on the computing device 102. In some embodiments, the plurality of sensitive information that may be at risk in response to the initiated scan of the plurality of dark web resources 302 may refer to information of the user, information of the computing device of the user, information of a communication account of the user, and/or information of an entity that is associated with the user.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21) NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary frequency adjustment module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary frequency adjustment module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the terms "mobile electronic device," "mobile computing device," "mobile device" or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

Figure 4:
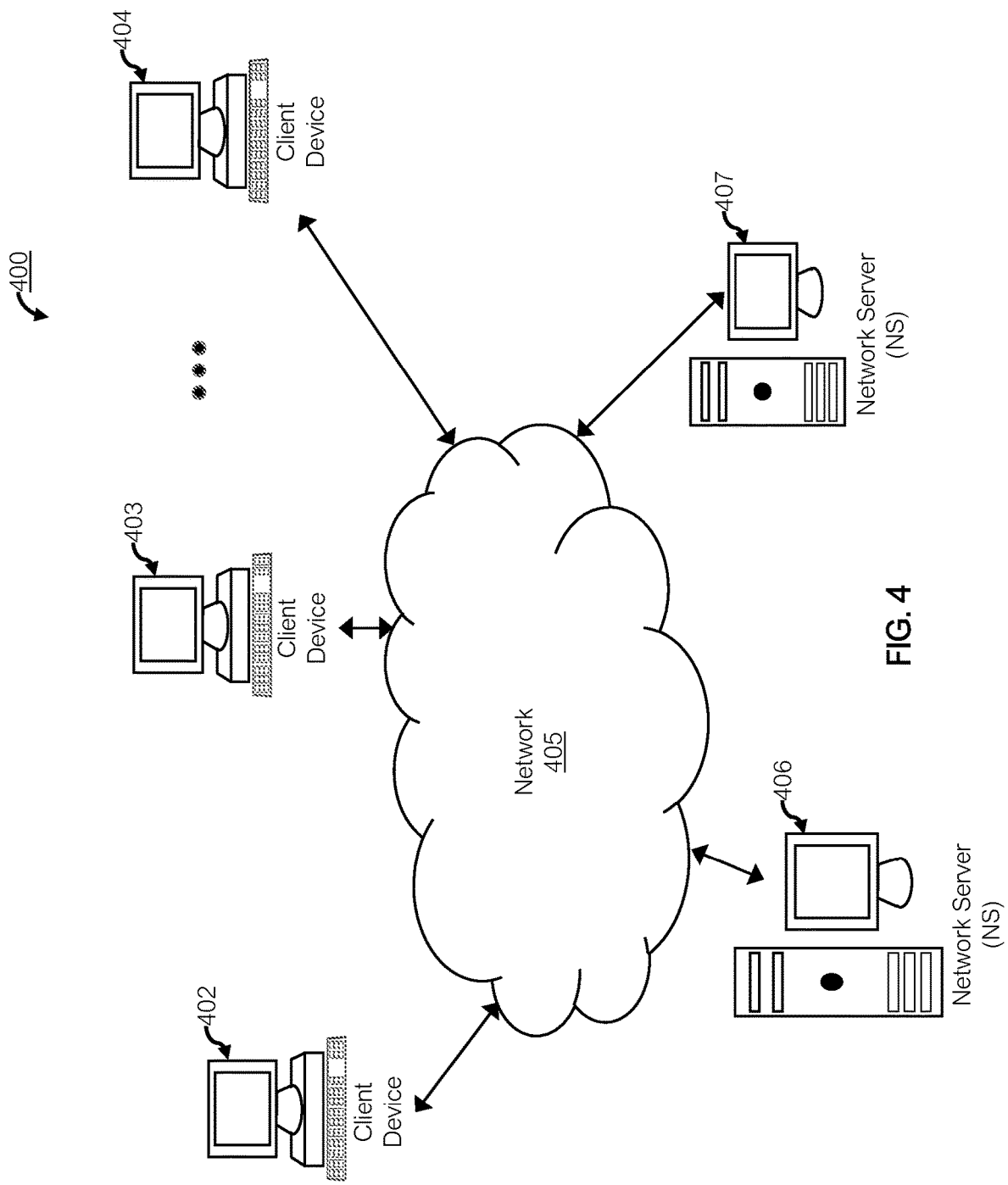
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage launching a plurality of software applications within a computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary frequency adjustment module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of simultaneously launching a plurality of software applications via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary frequency adjustment module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to launch software applications and dynamically perform a plurality of predetermined stress tests.

Figure 5:
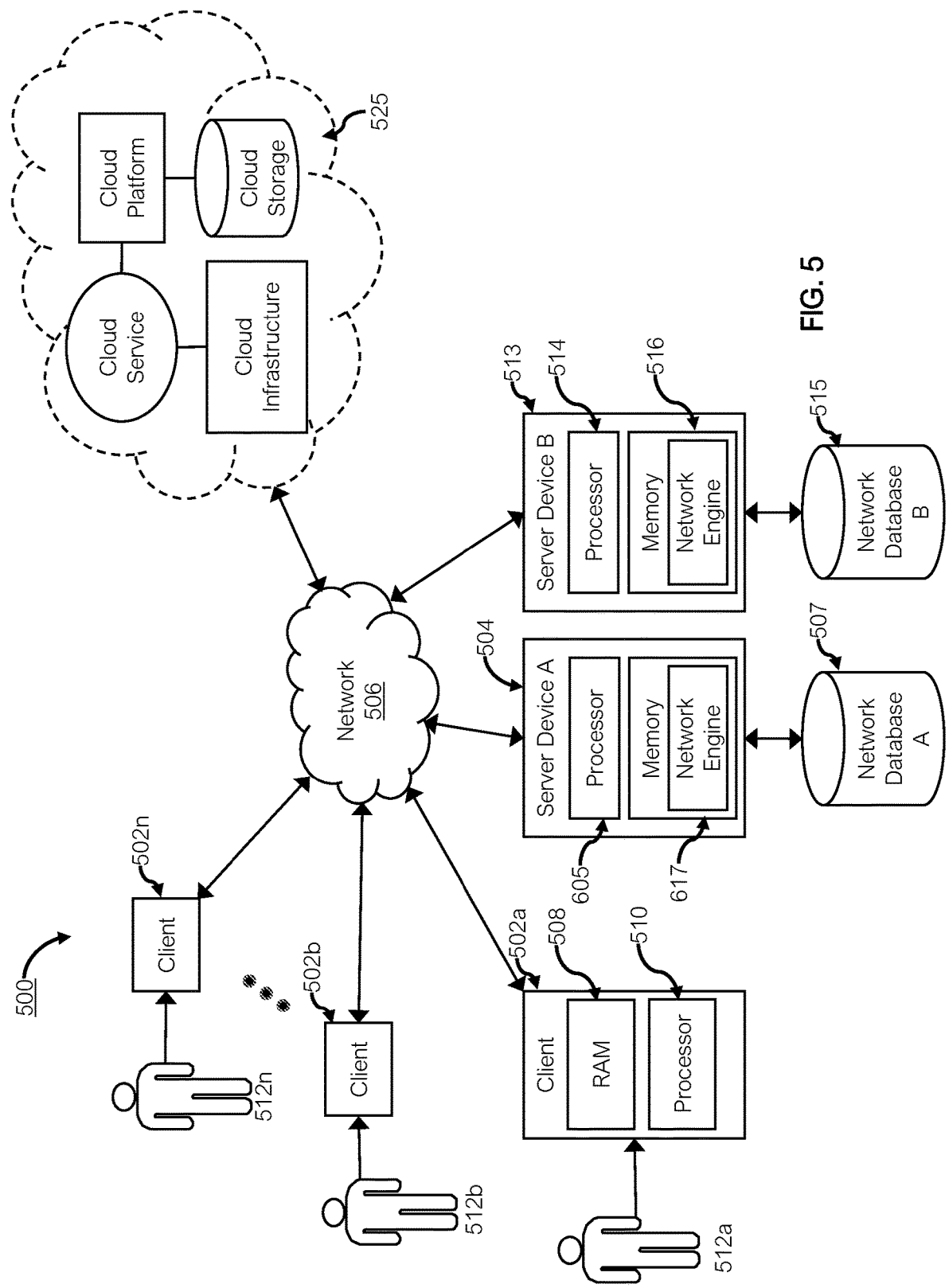
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 605 coupled to a memory that stores a network engine 617. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
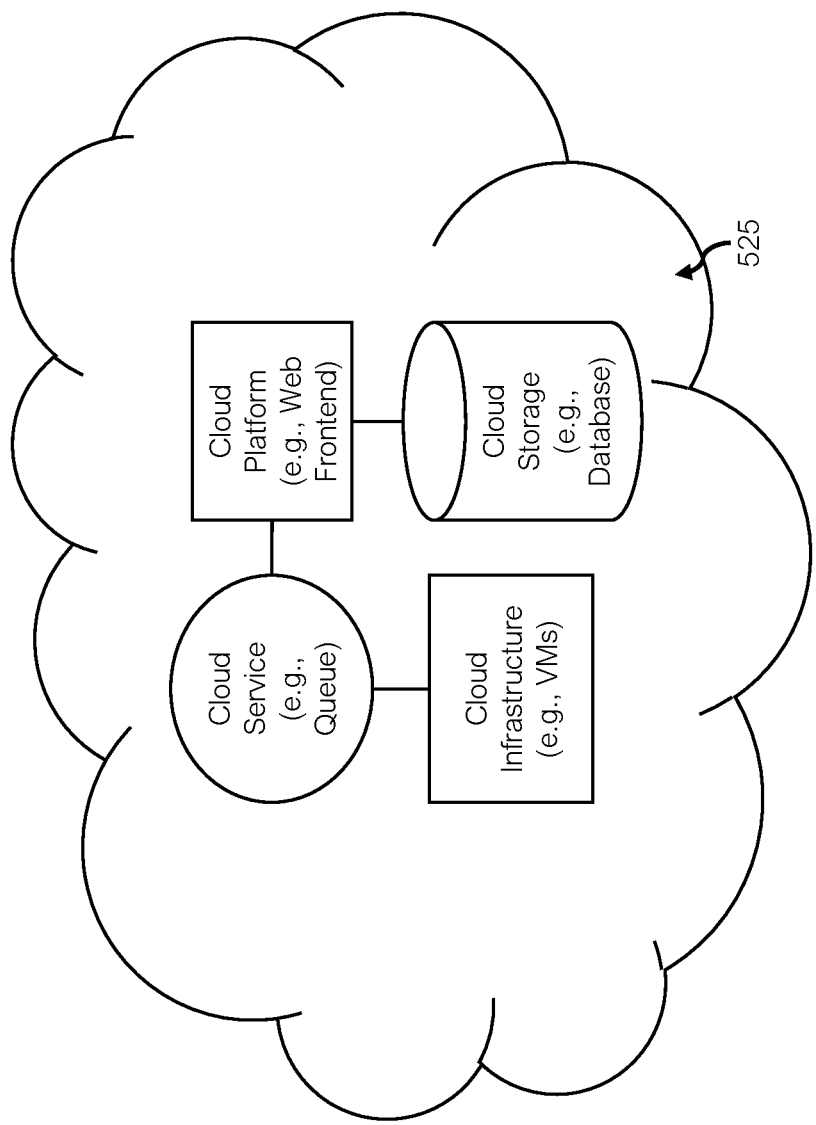
FIGS. 6 and 7 are diagrams illustrating implementations of cloud computing architecture/aspects with respect to which the disclosed technology may be specifically configured to operate, in accordance with one or more embodiments of the present disclosure.
Figure 7:
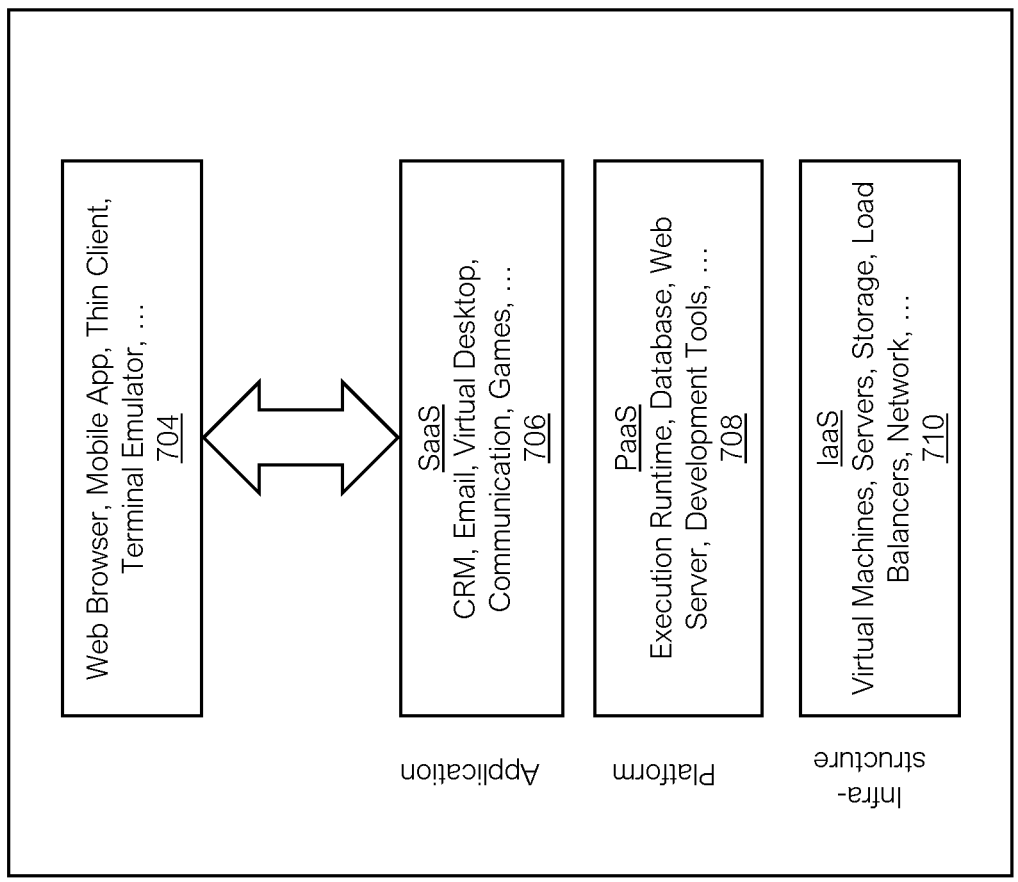

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A method may include: obtaining, by one or more processors, a trained spam upsurge detection machine learning model that determines when a current frequency associated with spam communications received by a current user exceeds a baseline frequency associated with the current user; receiving, by the one or more processors, from a computing device of a user, a permission indicator identifying a permission by the user to detect communications being received by the computing device; receiving, by the one or more processors, from the computing device, an indication of at least one communication being received; determining, by the one or more processors, the at least one communication as a particular spam communication; updating, by the one or more processors, a frequency at which spam communications have been received by the user based at least in part on the particular spam communication; utilizing, by the one or more processors, the trained spam upsurge detection machine learning model to determine that the frequency exceeds a baseline frequency associated with the user; and initiating, by the one or more processors, and in response to the determination, a scan of one or more dark web resources.

Clause 2. The method according to clause 1, where the spam upsurge detection machine learning model is trained to establish at least one of: a first baseline frequency associated with the particular spam communication received by a particular user; a second baseline frequency associated with the particular spam communication received at a particular computing device of the particular user; a third baseline frequency associated with the particular spam communication received at a particular communication modality of the particular user; a fourth baseline frequency associated with the particular spam communication received by a group of users; or a fifth baseline frequency associated with the particular spam communication received by an entity that is affiliated with the particular user.

Clause 3. The method according to clause 1 or 2, where the determining the at least one communication as the particular spam communication includes profiling, by the one or more processors, the at least one communication based on a SIP certificate of the at least one communication.

Clause 4. The method according to clause 1, 2 or 3, where the determining the at least one communication as the particular spam communication includes utilizing, by the one or more processors, a spam detection machine learning model to determine the at least one communication as the particular spam communication.

Clause 5. The method according to clause 1, 2, 3 or 4, where the one or more dark web resources are scanned based on at least one of: information of the user, information of the computing device of the user, information of a communication account of the user, or information of an entity that is associated with the user.

Clause 6. The method according to clause 1, 2, 3, 4 or 5, where the at least communication comprises one or more of: a phone call, an SMS message, an MMS message, an email, a voice message, a chat message, or a social media message.

Clause 7. The method according to clause 1, 2, 3, 4, 5 or 6, where the frequency is computed based on communications received at one or more communication modalities.

Clause 8. The method according to clause 1, 2, 3, 4, 5, 6 or 7, further including instructing, by the one or more processors, and in response to a scan result of the scanning of the one or more dark web resources, the computing device to commence at least one security measure that addresses a risk associated with the scan result.

Clause 9. The method according to clause 1, 2, 3, 4, 5, 6, 7 or 8, where the determining the at least one communication as the particular spam communication includes instructing, by the one or more processors, the computing device to execute at least one machine learning (ML) technique, at least one natural language processing (NPL) technique, or both, to obtain context data, content data, or both, for the at least one communication; receiving, by the one or more processors, from the computing device, the context data, the content data, or both, for the at least one communication; and determining, by the one or more processors, when the at least one communication is the particular spam communication based on the context data, the content data, or both, for the at least one communication.

Clause 10. A system may include: a non-transient computer memory, storing software instructions; at least one processor of a computing device; where, when the at least one processor executes the software instructions, the computing device is programmed to: obtain a trained spam upsurge detection machine learning model that determines when a current frequency associated with spam communications received by a current user exceeds a baseline frequency associated with the current user; receive from a computing device of a user, a permission indicator identifying a permission by the user to detect communications being received by the computing device; receive from the computing device, an indication of at least one communication being received; determine the at least one communication as a particular spam communication; update a frequency at which spam communications have been received by the user based at least in part on the particular spam communication; utilize the trained spam upsurge detection machine learning model to determine that the frequency exceeds a baseline frequency associated with the user; and initiate, in response to the determination, a scan of one or more dark web resources.

Clause 11. The system according to clause 10, where the spam upsurge detection machine learning model is trained to establish at least one of: a first baseline frequency associated with the particular spam communication received by a particular user; a second baseline frequency associated with the particular spam communication received at a particular computing device of the particular user; a third baseline frequency associated with the particular spam communication received at a particular communication modality of the particular user; a fourth baseline frequency associated with the particular spam communication received by a group of users; or a fifth baseline frequency associated with the particular spam communication received by an entity that is affiliated with the particular user.

Clause 12. The system according to clause 10 or 11, where to determine the at least one communication as the particular spam communication includes to profile the at least one communication based on a SIP certificate of the at least one communication.

Clause 13. The system according to clause 10, 11 or 12, where to determine the at least one communication as the particular spam communication includes utilize a spam detection machine learning model to determine the at least one communication as the particular spam communication.

Clause 14. The system according to clause 10, 11, 12 or 13, where the one or more dark web resources are scanned based on at least one of: information of the user, information of the computing device of the user, information of a communication account of the user, or information of an entity that is associated with the user.

Clause 15. The system according to clause 10, 11, 12, 13 or 14, where the at least communication comprises one or more of: a phone call, an SMS message, an MMS message, an email, a voice message, a chat message, or a social media message.

Clause 16. The system according to clause 10, 11, 12, 13, 14 or 15, where the frequency is computed based on communications received at one or more communication modalities.

Clause 17. The system according to clause 10, 11, 12, 13, 14, 15 or 16, where the computing device is further programmed to instruct, in response to a scan result of the scanning of the one or more dark web resources, the computing device to commence at least one security measure that addresses a risk associated with the scan result.

Clause 18. A computing device may include a non-transient computer memory, storing software instructions; at least one processor; where, when the at least one processor executes the software instructions, the computing device is programmed to: obtain a trained spam upsurge detection machine learning model that determines when a current frequency associated with spam communications received by a current user exceeds a baseline frequency associated with the current user; receive from a computing device of a user, a permission indicator identifying a permission by the user to detect communications being received by the computing device; receive from the computing device, an indication of at least one communication being received; determine the at least one communication as a particular spam communication; update a frequency at which spam communications have been received by the user based at least in part on the particular spam communication; utilize the trained spam upsurge detection machine learning model to determine that the frequency exceeds a baseline frequency associated with the user; and initiate, in response to the determination, a scan of one or more dark web resources.

Clause 19. The computing device according to clause 18, where the computing device is further programmed to instruct, in response to a scan result of the scanning of the one or more dark web resources, the computing device to commence at least one security measure that addresses a risk associated with the scan result.

Clause 20. The computing device according to clause 18 or 19, where the computing device is further programmed to automatically adjust the updated frequency associated with the one or more dark web resources based on the updated frequency exceeding the baseline frequency associated with the spam communications received by the computing device associated with the user.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
    obtaining, by one or more processors, a trained spam upsurge detection machine learning model that is trained to output a determination when a current frequency associated with spam communications received by a current user exceeds a baseline frequency associated with the current user;
    receiving, by the one or more processors, from a computing device of a user, a permission indicator identifying a permission by the user to detect communications being received by the computing device;
    receiving, by the one or more processors, from the computing device, an indication of at least one communication being received;
    identifying, by the one or more processors, using a spam detection machine learning model, that the at least one communication is a particular spam communication;
    updating, by the one or more processors, a frequency at which spam communications have been received by the user based at least in part on the particular spam communication;
    utilizing, by the one or more processors, the trained spam upsurge detection machine learning model to determine that the frequency exceeds a baseline frequency associated with the user; and
    initiating, by the one or more processors, and in response to the determination, a scan of one or more dark web resources.

2. The method of claim 1, wherein the spam upsurge detection machine learning model is trained to establish at least one of: a first baseline frequency associated with the particular spam communication received by a particular user; a second baseline frequency associated with the particular spam communication received at a particular computing device of the particular user; a third baseline frequency associated with the particular spam communication received at a particular communication modality of the particular user; a fourth baseline frequency associated with the particular spam communication received by a group of users; or a fifth baseline frequency associated with the particular spam communication received by an entity that is affiliated with the particular user.

3. The method of claim 1, wherein the determining the at least one communication as the particular spam communication comprises:
    profiling, by the one or more processors, the at least one communication based on a SIP certificate of the at least one communication.

4. The method of claim 1, wherein the determining the at least one communication as the particular spam communication comprises:
    utilizing, by the one or more processors, a spam detection machine learning model to determine the at least one communication as the particular spam communication.

5. The method of claim 1, wherein the one or more dark web resources are scanned based on at least one of: information of the user, information of the computing device of the user, information of a communication account of the user, or information of an entity that is associated with the user.

6. The method of claim 1, wherein the at least communication comprises one or more of: a phone call, an SMS message, an MMS message, an email, a voice message, a chat message, or a social media message.

7. The method of claim 1, wherein the frequency is computed based on communications received at one or more communication modalities.

8. The method of claim 1, further comprising:
    instructing, by the one or more processors, and in response to a scan result of the scanning of the one or more dark web resources, the computing device to commence at least one security measure that addresses a risk associated with the scan result.

9. The method of claim 1, wherein the determining the at least one communication as the particular spam communication comprises:
    instructing, by the one or more processors, the computing device to execute at least one machine learning (ML) technique, at least one natural language processing (NPL) technique, or both, to obtain context data, content data, or both, for the at least one communication;
    receiving, by the one or more processors, from the computing device, the context data, the content data, or both, for the at least one communication; and
    determining, by the one or more processors, when the at least one communication is the particular spam communication based on the context data, the content data, or both, for the at least one communication.

10. A system comprising:
    a non-transient computer memory, storing software instructions; and
    at least one processor of a computing device;
    wherein, when the at least one processor executes the software instructions, the computing device is programmed to:
        obtain a trained spam upsurge detection machine learning model that is trained to output a determination when a current frequency associated with spam communications received by a current user exceeds a baseline frequency associated with the current user;

receive from a computing device of a user, a permission indicator identifying a permission by the user to detect communications being received by the computing device;

receive from the computing device, an indication of at least one communication being received;

identify, using a spam detection machine learning module, that the at least one communication is a particular spam communication;

update a frequency at which spam communications have been received by the user based at least in part on the particular spam communication;

utilize the trained spam upsurge detection machine learning model to determine that the frequency exceeds a baseline frequency associated with the user; and initiate, in response to the determination, a scan of one or more dark web resources.

11. The system of claim 10, wherein the spam upsurge detection machine learning model is trained to establish at least one of: a first baseline frequency associated with the particular spam communication received by a particular user; a second baseline frequency associated with the particular spam communication received at a particular computing device of the particular user; a third baseline frequency associated with the particular spam communication received at a particular communication modality of the particular user; a fourth baseline frequency associated with the particular spam communication received by a group of users; or a fifth baseline frequency associated with the particular spam communication received by an entity that is affiliated with the particular user.

12. The system of claim 10, wherein to determine the at least one communication as the particular spam communication comprises to:
profile the at least one communication based on a SIP certificate of the at least one communication.

13. The system of claim 10, wherein to determine the at least one communication as the particular spam communication comprises to:
utilize a spam detection machine learning model to determine the at least one communication as the particular spam communication.

14. The system of claim 10, wherein the one or more dark web resources are scanned based on at least one of: information of the user, information of the computing device of the user, information of a communication account of the user, or information of an entity that is associated with the user.

15. The system of claim 10, wherein the at least communication comprises one or more of: a phone call, an SMS message, an MMS message, an email, a voice message, a chat message, or a social media message.

16. The system of claim 10, wherein the frequency is computed based on communications received at one or more communication modalities.

17. The system of claim 10, wherein the computing device is further programmed to:
instruct, in response to a scan result of the scanning of the one or more dark web resources, the computing device to commence at least one security measure that addresses a risk associated with the scan result.

18. A computing device comprising:
a non-transient computer memory, storing software instructions; and
at least one processor;
wherein, when the at least one processor executes the software instructions, the computing device is programmed to:
obtain a trained spam upsurge detection machine learning model that is trained to output a determination when a current frequency associated with spam communications received by a current user exceeds a baseline frequency associated with the current user;
receive from a computing device of a user, a permission indicator identifying a permission by the user to detect communications being received by the computing device;
receive from the computing device, an indication of at least one communication being received;
identify, using a spam detection machine learning module, that the at least one communication is a particular spam communication;
update a frequency at which spam communications have been received by the user based at least in part on the particular spam communication;
utilize the trained spam upsurge detection machine learning model to determine that the frequency exceeds a baseline frequency associated with the user; and
initiate, in response to the determination, a scan of one or more dark web resources.

19. The computing device of claim 18, wherein the computing device is further programmed to instruct, in response to a scan result of the scanning of the one or more dark web resources, the computing device to commence at least one security measure that addresses a risk associated with the scan result.

20. The computing device of claim 18, wherein the computing device is further programmed to automatically adjust the updated frequency associated with the one or more dark web resources based on the updated frequency exceeding the baseline frequency associated with the spam communications received by the computing device associated with the user.

* * * * *